US006204896B1

(12) United States Patent
Matsuhira et al.

(10) Patent No.: US 6,204,896 B1
(45) Date of Patent: Mar. 20, 2001

(54) DISPLAY UNIT, MANUFACTURING METHOD THEREOF AND ELECTRONIC DEVICE EQUIPPED WITH SAME

(75) Inventors: Tsutomu Matsuhira; Kimiko Munemasa, both of Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 08/796,684

(22) Filed: Feb. 10, 1997

(30) Foreign Application Priority Data

Feb. 9, 1996 (JP) .................................................... 8-024377

(51) Int. Cl.⁷ ............................ G02F 1/1333; G06F 3/033
(52) U.S. Cl. ............................ 349/12; 349/122; 349/187
(58) Field of Search .......................... 349/12, 122, 155, 349/158, 187; 156/330, 276, 331.1, 274.8, 275.5, 279; 345/104, 173, 179; 178/18.03, 18.09, 19.04

(56) References Cited

U.S. PATENT DOCUMENTS 4,242,388 12/1980 Kaufmann .............................. 428/35
5,386,219 * 1/1995 Greanias et al. ...................... 345/174

FOREIGN PATENT DOCUMENTS 2263009   7/1993 (GB) .

OTHER PUBLICATIONS

Patent Abstracts of Japan, vol. 006, No. 255 (P–162) Dec. 14, 1982.
Patent Abstracts of Japan, vol. 018, No. 497 (p–1801) Sep. 16, 1994.
Patent Abstracts of Japan, vol. 095, No. 008 Sep. 29, 1995.

* cited by examiner

Primary Examiner—William L. Sikes
Assistant Examiner—Tai V. Duong
(74) Attorney, Agent, or Firm—Adams & Wilks

(57) ABSTRACT

A display unit comprises a transparent touch switch and a liquid crystal display having a display surface. At least an input area of the transparent touch switch is laminated to the display surface of the liquid crystal display by clear adhesive. The clear adhesive has a permeability after hardening which is close to the permeability of the liquid crystal display and the transparent touch switch. Clear fillers are disposed in the clear adhesive to prevent warping of the transparent touch switch and the liquid crystal display.

20 Claims, 3 Drawing Sheets

FIG. 7          PRIOR ART

DISPLAY UNIT, MANUFACTURING METHOD THEREOF AND ELECTRONIC DEVICE EQUIPPED WITH SAME

BACKGROUND OF THE INVENTION

The present invention relates to a display unit having a touch switch, a manufacturing method of the same, and an electronic device equipped with such a display unit.

Heretofore, as shown in FIG. 7, as a method for disposing a transparent touch switch on a liquid crystal display, a transparent touch switch 4 is adhered and secured by a double coated adhesive 10 having a thickness of about 0.5 mm to 1 mm and provided at the periphery of a liquid crystal display which is concealed and held between at least two transparent substrates 1a and 1b, and optical films 2a and 2b are pasted on the surface of the transparent substrates.

However, when the transparent touch switch is disposed on the liquid crystal display, the image quality thereof degrades because light coming from the outside is reflected on the surface of the transparent touch switch and on the surface between the transparent touch switch and the display panel. In particular, the screen is darkened and the image quality degrades remarkably when the touch switch is placed on a reflective type liquid crystal display.

SUMMARY OF THE INVENTION

It is an object of the present invention to improve the image quality of a display unit equipped with a transparent touch switch.

Another object of the present invention is to provide a method for manufacturing a display unit equipped with a transparent touch switch and having an improved image quality.

Another object of the present invention is to provide an electronic device having a display unit equipped with a transparent touch switch and having an improved image quality.

In order to solve the above-mentioned problem in the prior art, the foregoing and other objects of the present invention are carried out by a display unit comprising a transparent touch switch and a liquid crystal display having a display surface. The display surface of the liquid crystal display is adhered to the back of an input area of the transparent touch switch by clear adhesive. The transparent touch switch is preferably of an analog resistance film type, a digital resistance film type, an electrostatic capacity type or an ultrasound type. The liquid crystal display is formed and supported between two transparent films or transparent substrates. Because this arrangement allows the reflectance between the transparent touch switch and the liquid crystal display to be reduced as compared to the prior art display units, the image quality is improved.

In another embodiment of the display unit of the present invention, clear fillers are mixed into the clear adhesive. By this construction, uneven display which is otherwise caused by the hardening and shrinkage of the clear adhesive when a touch switch having a large input area is adhered may be suppressed without damaging the image quality.

In another aspect, a method is provided for manufacturing a display unit according to the present invention. A transparent touch switch is provided and a clear adhesive is applied to at least an input area on a rear surface of the transparent touch switch. The transparent touch switch is then turned over and aligned with a liquid crystal display such that the rear surface of the transparent touch switch having the clear adhesive confronts a display surface of the liquid crystal display. After the adhesive begins to form a drip, the transparent touch switch is slowly and continuously moved towards the liquid crystal display. The clear adhesive is allowed to flow between the transparent touch switch and the liquid crystal display until the clear adhesive expands to a predetermined area on the display surface of the liquid crystal display. Thereafter, the clear adhesive is cured and the transparent touch switch and liquid crystal display are laminated together. By this manufacturing method, the clear adhesive is allowed to be filled between the transparent touch switch and the liquid crystal display without the formation of bubbles therein.

In another aspect of the present invention, there is provided an electronic device having a display unit in which a transparent touch switch is adhered surface-to-surface, at least at an input area thereof, with a display surface of a liquid crystal display by a clear adhesive, and an input pen having a mechanism for absorbing a force applied to the transparent touch switch. Because the input pen allows the force applied to the transparent touch switch to be suppressed below a predetermined value, no uneven display occurs on the display surface of the liquid crystal display.

The display unit constructed as described above allows the image quality to be improved and may be manufactured readily without requiring an expensive manufacturing machine.

BRIEF DESCRIPTION OF THE DRAWINGS

FIG. 7 is a side view of a prior art display unit.

DETAILED DESCRIPTION OF THE PREFERRED EMBODIMENTS

Preferred embodiments of the present invention will be explained below with reference to the drawings.

[First Embodiment]

Figure 1:
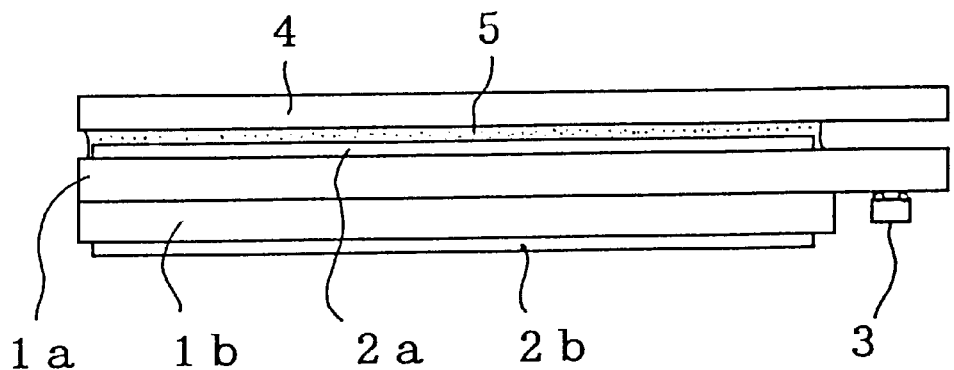
FIG. 1 is a side view of a display unit according to an embodiment of the present invention.

FIG. 1 is a schematic side view showing a first embodiment of the inventive display unit. In the display unit of the present embodiment, a liquid crystal display comprises a liquid crystal layer sandwiched between two transparent substrates (e.g., glass) 1a and 1b each having a thickness of, for example, 0.7 mm. A polarizing plate 2a and a polarizing plate 2b adhered to a reflecting plate (not shown) are attached to the transparent substrates 1a and 1b, respectively. A driver IC 3 for driving the liquid crystal display is mounted at a terminal section of the transparent substrates 1a. A touch switch 4 of an analog resistance film type using, for example, 0.7 mm thick glass is adhered on the display side of the liquid crystal display by a clear adhesive 5. The clear adhesive 5 surrounds the periphery of the liquid crystal display and the entire input area of the touch switch 4. If clear adhesive having a refractive index of 1.47 to 1.57 after hardening is used, the reflection between the touch switch 4 and the liquid crystal display is almost eliminated and the image quality of the display unit is improved because it is almost equal to the refractive index of the glass substrate (i.e., 1.52).

It is also most preferable to use a clear adhesive whose refractive index after hardening is equal to the refractive index of glass of 1.52. That is, because the refractive index of the glass to which the touch switch is adhered and that of the clear adhesive after hardening are equal, reflection between the touch switch and the liquid crystal display is eliminated and the image quality is improved considerably.

The touch switch used here is not confined only to that of the analog resistance film type, and other types of touch switches, such as a resistance film digital type or an ultrasound type, may be used.

[Second Embodiment]

Figure 2:
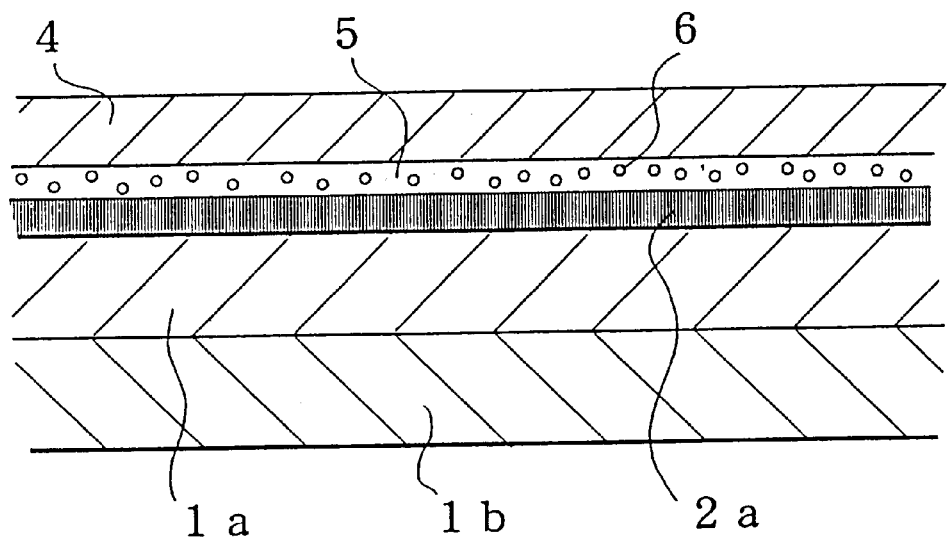
FIG. 2 is a cross-sectional view of a display unit according to another embodiment of the present invention.

FIG. 2 shows a second embodiment of the inventive display unit. The basic structure thereof is the same as that of the first embodiment. Because the clear adhesive 5 for adhering the touch switch 4 to the liquid crystal display has a hardening shrinkage factor of about 5%, there is a possibility that the touch switch and the liquid crystal display warp and cause an unevenness on the display screen when the adhesive is hardened. Therefore, in this embodiment clear fillers 6 are mixed in the clear adhesive 5 to lower the hardening shrinkage factor to prevent warping of the touch switch and the liquid crystal display.

The clear fillers 6 of the present embodiment are preferably true spherical plastic particles whose diameter is 12 microns and whose refractive index is 1.47 to 1.57. That is, it is preferable to use clear fillers having a refractive index close to the refractive index of the clear adhesive after hardening.

The percentage of the fillers mixed in the adhesive is set at 2 wt %. When they are mixed more than that, the adhesive layer becomes cloudy, thus degrading the image quality. However, it is possible to mix more when the refractive index of the fillers and the adhesive are almost same (e.g. 1.52) because the cloudiness of the adhesive layer is reduced.

[Third Embodiment]

Figure 3:
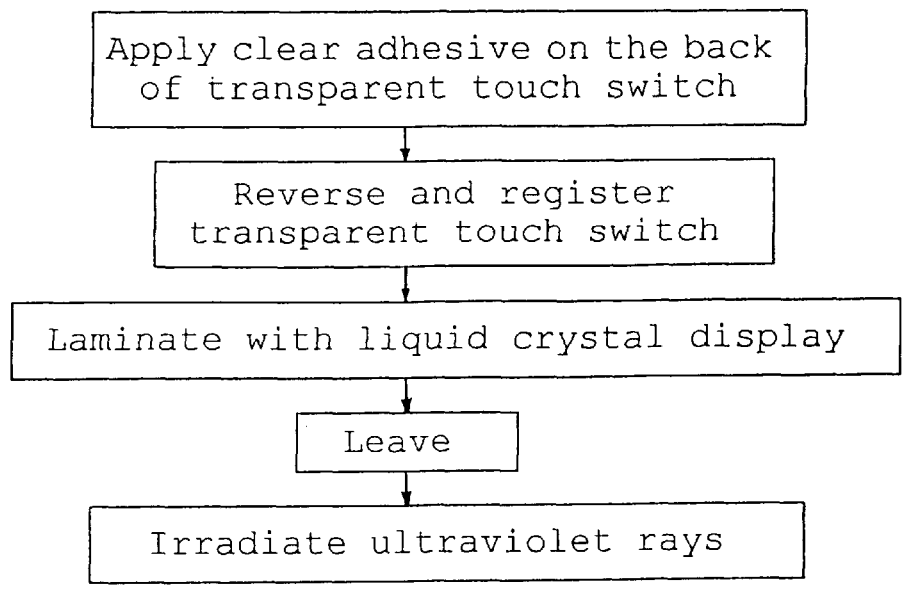
FIG. 3 is a flowchart for explaining a method for manufacturing the display unit of the present invention.
Figure 4A:
FIGS. 4(A)–4(C) are explanatory views showing a sequence of steps for manufacturing the display unit of the present invention.
Figure 4B:
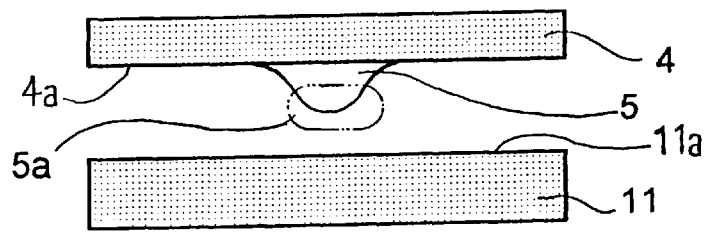
Figure 4C:
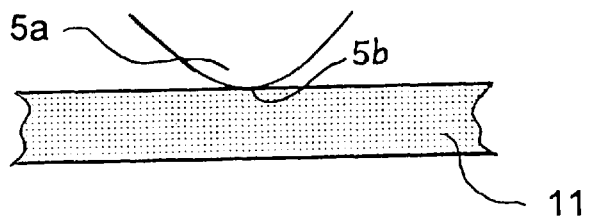

FIG. 3 is a flowchart and FIGS. 4(A)–4(C) are a sequence of steps showing a method for manufacturing a display unit according to the present invention having a transparent touch switch 4 and a liquid crystal display 11. First, the transparent touch switch 4 is flipped back and a blob of clear adhesive 5 is applied centrally on a predetermined area of a rear surface 4a of the transparent touch switch (FIG. 4(A)). Preferably, the clear adhesive 5 is applied to at least an input area of the transparent touch switch. A degassed clear adhesive may be used, as necessary. The clear adhesive 5 can be, for example, an ultraviolet hardening clear adhesive of which about 0.7 g is applied in the case where the liquid crystal display has a length of about 6 inches.

Next, as shown in FIG. 4(B), the transparent touch switch 4 is turned upside down and aligned in registry with a display surface 11a of the liquid crystal display 11 so that the rear surface 4a of the transparent touch switch 4 confronts the display surface 11a of the liquid crystal display. As the adhesive 5 begins to drip and forms a drop 5a, the transparent touch switch 4 is laminated on the liquid crystal display 11. During the lamination step, the transparent touch switch 4 is slowly and continuously moved toward the liquid crystal display 11 so that bubbles are not produced when a surface 5b of the drop 5a contacts the display surface 11a of the liquid crystal display (FIG. 4(C)).

Figure 5:
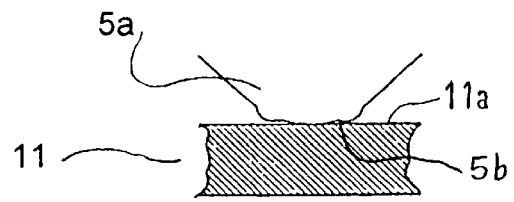
FIG. 5 is an explanatory view showing how bumps and bubbles are formed between a touch switch and a liquid crystal display when the touch switch is moved too rapidly toward the liquid crystal display during a lamination step.

As shown in FIG. 5, for example, the surface 5b of the drop 5a which contacts the display surface 11a of the liquid crystal display becomes bumpy and uneven if the transparent touch switch 4 is moved too quickly toward the display surface 11a of the liquid crystal display 11. The bumps produce bubbles in the adhesive which prevent formation of a uniform adhesive layer and which ultimately lowers the strength and the image quality of the display unit. In order to avoid this problem, according to the method of the present invention, the transparent touch switch 4 is moved slowly and continuously towards the liquid crystal display 11 during the lamination step until the surface of the drop 5a contacts the display surface 11a of the liquid crystal display and the adhesive 5 expands and spreads over the display surface to an area preferably substantially equal to the area of the rear surface 4a of the transparent touch switch covered by the adhesive during the adhesive application step. The transparent touch switch 4 and the liquid crystal display 11 are then maintained in this position for a predetermined period of time to allow the adhesive 5 to flow slowly between the transparent touch switch and the liquid crystal display, without the application of an external pressure, until the adhesive expands and spreads to a predetermined area on the display surface 11a of the liquid crystal display and forms a continuous adhesive layer (FIGS. 1, 2).

The amount of time which the adhesive 5 is left to expand and spread between the transparent touch switch 4 and the liquid crystal display 11 depends on the viscosity of the adhesive selected. Other factors include the weight of the transparent touch switch 4 and the quantity of the adhesive applied. For example, when the viscosity of the adhesive is preferably within a range of 1000 to 6000 cp., the transparent touch switch 4 and the liquid crystal display 11 are left for about 30 to 60 minutes in order to allow the adhesive to expand between the transparent touch switch and the liquid crystal display by normal expansion of the adhesive without application of an external pressure.

After confirming that the adhesive 5 has expanded to a predetermined area on the display surface 11a of the liquid crystal display 11, the adhesive is cured by, for example, irradiating ultraviolet rays uniformly from the top thereof to harden it. In the present embodiment, the thickness of the resulting adhesive layer is about 0.1 mm to 0.2 mm, which is thinner than the thickness of 0.4 mm to 0.8 mm. in the resulting adhesive layers of prior art display units. This allows for miniaturization of the display unit by reducing the overall thickness of the display unit.

When the viscosity of the adhesive is high, e.g. 10000 cp., it will not expand and spread between the transparent touch switch and the liquid crystal display to form a desired adhesive layer. However, since the viscosity of the adhesive lowers by the application of heat, an adhesive having an initial viscosity of about 20000 cp. may expand to form a desired adhesive layer if heat is applied to the adhesive during the predetermined period of time which the adhesive is left to expand between the transparent touch switch 4 and the liquid crystal display 11.

The adhesive 5 is not limited only to an ultraviolet hardening type adhesive. That is, the adhesive 5 may be a two-liquid type epoxy adhesive so long as it generates almost no gas. However, a thermal hardening type adhesive having a high viscosity which requires heat treatment cannot be used because hardening of the such adhesive advances when heat is applied while the adhesive is left to expand between the transparent touch switch 4 and the liquid crystal display 11.

The clear adhesive 5 may be applied to the side of the liquid crystal display 11. In this case, when ultraviolet rays are irradiated from the side of the transparent touch switch 4 to cure the adhesive, such as an ultraviolet hardening type clear adhesive, the lamination is carried out on a transparent stage, such as quartz glass, and the ultraviolet rays are irradiated through the quartz glass.

Although in the method of the present embodiment only one blob of the adhesive 5 is applied to the rear surface of the transparent touch switch 4, it is understood that two or more blobs may be applied at preselected areas of the rear surface. Alternatively, the blob or blobs of the clear adhesive may be applied on the display surface of the liquid crystal display, following which the transparent touch switch and the liquid crystal display are then laminated to form a clear adhesive layer therebetween.

[Fourth Embodiment]

Figure 6:
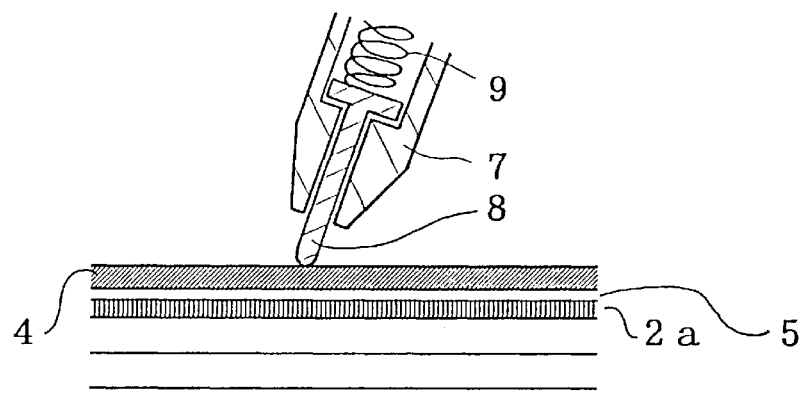
FIG. 6 is a cross-sectional view of a special pen for use in an electronic device of the present invention.
Figure 6:
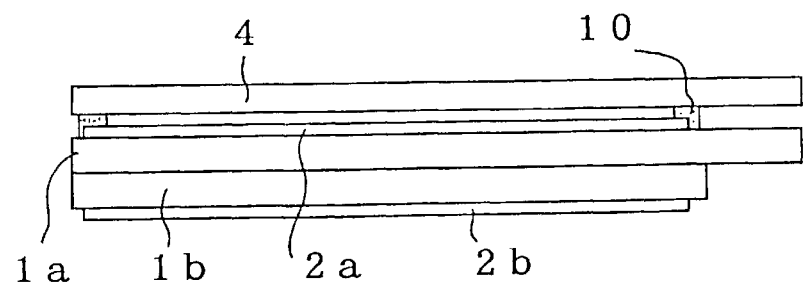

FIG. 6 shows an embodiment of an electronic device having the inventive display unit equipped with the transparent touch switch according to the foregoing embodiments. In this embodiment, the electronic device comprises a tablet and input pen. Unevenness of display, which is otherwise caused on the liquid crystal screen when inputting information on the touch switch surface by a pen, is prevented according to the present invention by using a special pen 7. That is, when a force of about 200 g to 300 g or more is applied to the touch switch by the tip of the pen, there is a possibility that uneven display occurs on the screen of the liquid crystal display by the force which acts via the adhesive. The present invention provides a pen 7 having a mechanism for absorbing the force of 200 g or more which causes the uneven display, i.e., a mechanism by which no force of 200 g or more can be applied to the touch switch by the pen.

As shown in FIG. 6, a pen 7 according to the present invention has a displaceable tip member 8 having a front end for contacting the liquid crystal screen of the display unit to input information and a rear end which abuts against one end of a spring 9. The spring 9 is selected to undergo contraction when, for example, a force of 200 g or more is axially applied thereto by the tip member 8. In this manner, because no force of 200 g or more is applied to the liquid crystal display by the pen 7, it is possible to input information by the pen without damaging the image quality of the liquid crystal display. The structure of the pen 7 is not confined specifically to that described above.

Furthermore, because the operating force of the touch switch of the analog resistance film type is 15 g to 100 g, an electronic device which does not suffer from operational difficulties of the touch switch and which does not damage the image quality of the liquid crystal display may be realized by providing a pen in which no force of 100 g or more can be applied to the touch switch by the pen according to the present invention, which can be achieved by providing a spring which contracts with a force of 100 g or more.

Thus the present invention provides a display unit comprising a transparent touch switch and a liquid crystal display comprised of a liquid crystal layer disposed between a pair of transparent substrates. A display surface of the liquid crystal display is adhered to the transparent touch switch using a clear adhesive. By this construction, the reflectance between the transparent touch switch and the liquid crystal display is effectively reduced as compared with prior art display units, thereby improving the image quality of the display unit. Furthermore, by providing a clear adhesive having a refractive index which is equal to the refraction indices of the transparent touch switch and the transparent substrates supporting the liquid crystal layer, the reflection of light between the transparent touch switch and liquid crystal display is almost eliminated, thereby further improving the image quality of the display unit.

Accordingly, the present invention allows the image quality of the display unit equipped with the transparent touch switch to be improved and allows for miniaturization of the display unit by reduction of its overall thickness. Furthermore, the strength of the display unit is enhanced by adhering the transparent touch switch and the display surface of the liquid crystal display in surface-to-surface relationship while preventing formation of bubbles in the resulting adhesive layer. Moreover, the display unit may be provided at low cost because no investment for an expensive facility is required for its manufacture.

What is claimed is:

1. A display unit comprising: a liquid crystal display having a display surface; a transparent touch switch laminated on the display surface of the liquid crystal display; a clear adhesive layer interposed between the display surface of the liquid crystal display and the transparent touch switch; and a plurality of clear fillers disposed in the clear adhesive layer, the clear fillers comprising elastic spherical particles having a refractive index approximately equal to the refractive index of the clear adhesive layer.

2. A display unit according to claim 1; wherein the transparent touch switch has a refractive index approximately equal to a refractive index of the clear adhesive layer.

3. A display unit according to claim 1; wherein the liquid crystal display comprises a liquid crystal layer and a pair of transparent substrates sandwiching the liquid crystal layer therebetween.

4. A display unit according to claim 3; wherein the refractive index of the clear adhesive layer is approximately equal to the refractive index of each of the transparent touch switch and the transparent substrates.

5. A display unit according to claim 1; wherein the refractive index of the adhesive layer and that of the plastic spherical particles are within the range 1.47 to 1.57.

6. A display unit according to claim 5; wherein the plastic spherical particles are all of the same size.

7. A display unit according to claim 6; wherein the plastic spherical particles have a diameter of 12 microns.

8. A display unit according to claim 7; wherein the plastic spherical particles have a diameter substantially less than the thickness of the adhesive layer.

9. A display unit according to claim 1; wherein the plastic spherical particles have a diameter substantially less than the thickness of the adhesive layer.

10. A display unit according to claim 1; wherein the plastic spherical particles have a diameter of 12 microns.

11. A display unit according to claim 1; wherein the plastic spherical particles are all of the same size.

12. A display unit according to claim 11; wherein the plastic spherical particles have a diameter substantially less than the thickness of the adhesive layer.

13. A display unit according to claim 1; further including an input pen contactable with the transparent touch switch of the display unit for inputting information, the input pen having a mechanism for absorbing forces above a preselected value applied to the transparent touch switch by the input pen.

14. A display unit and input pen according to claim 13; wherein the preselected value is within the range 200 g to 300 g.

15. A display unit and input pen according to claim 14; wherein the mechanism comprises a spring.

16. A display unit and input pen according to claim 13; wherein the preselected value is 200 g.

17. A display unit and input pen according to claim 13; wherein the transparent touch switch comprises an analog resistance film touch switch; and the preselected value is 100 g.

18. A method for manufacturing a display unit, comprising the steps of:

applying a clear adhesive to either a surface of a transparent touch switch or a display surface of a liquid crystal display, the clear adhesive containing a plurality of plastic spherical particles having a refractive index approximately equal to the refractive index of the clear adhesive; and laminating the surface of the transparent touch switch to the display surface of the liquid crystal display.

19. A method for manufacturing a display unit as claimed in claim 18; wherein the laminating step comprises disposing the transparent touch switch over the liquid crystal display, allowing the clear adhesive to flow between the surface of the transparent touch switch and the display surface of the liquid crystal display for a predetermined period of time, and curing the clear adhesive.

20. A method for manufacturing a display unit as claimed in claim 19; wherein the curing step comprises irradiating ultraviolet rays over the clear adhesive.

* * * * *